US010231045B2

(12) United States Patent
Lee et al.

(10) Patent No.: US 10,231,045 B2
(45) Date of Patent: Mar. 12, 2019

(54) PORTABLE ACOUSTIC DEVICE

(71) Applicant: LG ELECTRONICS INC., Seoul (KR)

(72) Inventors: Minjong Lee, Seoul (KR); Woojung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/577,619

(22) PCT Filed: Jun. 30, 2015

(86) PCT No.: PCT/KR2015/006650
§ 371 (c)(1),
(2) Date: Nov. 28, 2017

(87) PCT Pub. No.: WO2016/204330
PCT Pub. Date: Dec. 22, 2016

(65) Prior Publication Data
US 2018/0139529 A1 May 17, 2018

(30) Foreign Application Priority Data
Jun. 18, 2015 (KR) .................. 10-2015-0086513

(51) Int. Cl.
*H04R 1/10* (2006.01)
*G10K 11/178* (2006.01)
*G06F 3/16* (2006.01)

(52) U.S. Cl.
CPC .......... *H04R 1/1041* (2013.01); *G06F 3/165* (2013.01); *G10K 11/17827* (2018.01);
(Continued)

(58) Field of Classification Search
CPC ...... H04R 1/10; H04R 1/1016; H04R 1/1025; H04R 1/1066; H04R 2420/07; G10K 2210/1081; G10K 2210/3045
See application file for complete search history.

(56) References Cited

U.S. PATENT DOCUMENTS 9,301,037 B1 * 3/2016 Kalyvas ............... H04R 1/1066
2001/0016506 A1 * 8/2001 Son ..................... H04M 1/6066
455/569.1
(Continued)

FOREIGN PATENT DOCUMENTS

JP 2013-123260 A 6/2013
KR 10-2007-0055677 A 5/2007
(Continued)

*Primary Examiner* — Mohammad Islam
(74) *Attorney, Agent, or Firm* — Birch, Stewart, Kolasch & Birch, LLP

(57) ABSTRACT

In order to achieve the above-mentioned object or another objective, a portable acoustic device according to one aspect of the present invention comprises: a man body housing having an opening at a first surface thereof; an acoustic output unit provided inside the main body housing; an ear housing having a first end portion connected to the opening at the first surface of the main body housing, and having an acoustic hole formed at a second end portion; and a rotating module for rotating the ear housing relative to the main body housing, wherein the portable acoustic device can be carried by being inserted into the ear of a user, can be worn in either the left ear or the right, and increases wearing sensation by being wearable since the angle thereof is changed to be suitable for the ears of the user.

14 Claims, 10 Drawing Sheets

(52) U.S. Cl.
CPC ......... *H04R 1/1016* (2013.01); *H04R 1/1025* (2013.01); *H04R 1/1066* (2013.01); *G10K 2210/1081* (2013.01); *G10K 2210/3045* (2013.01); *H04R 2201/107* (2013.01); *H04R 2201/109* (2013.01); *H04R 2420/07* (2013.01)

(56) References Cited

U.S. PATENT DOCUMENTS

| | | | |
|---|---|---|---|
| 2007/0049361 A1 | 3/2007 | Coote et al. | |
| 2007/0133836 A1* | 6/2007 | Lee .................. | H04M 1/05 381/370 |
| 2008/0152182 A1* | 6/2008 | Bevirt ................ | H04R 1/1058 381/371 |
| 2010/0320961 A1* | 12/2010 | Castillo ................ | H02J 7/0044 320/107 |
| 2015/0350762 A1* | 12/2015 | Birger ................ | H04R 1/1016 381/74 |
| 2017/0245039 A1* | 8/2017 | Chen .................... | H02J 7/0052 |
| 2018/0131793 A1* | 5/2018 | Kim .................. | H04M 1/05 |

FOREIGN PATENT DOCUMENTS

| | | |
|---|---|---|
| KR | 10-0800767 B1 | 2/2008 |
| KR | 10-2010-0041386 A | 4/2010 |
| KR | 10-0953835 B1 | 4/2010 |
| KR | 10-1446597 B1 | 10/2014 |

\* cited by examiner (a)   (b)

PORTABLE ACOUSTIC DEVICE

CROSS REFERENCE TO RELATED APPLICATIONS

This application is the National Phase of PCT International Application No. PCT/KR2015/006650, filed on Jun. 30, 2015, which claims priority under 35 U.S.C. 119(a) to patent application SER. No. 10-2015-0086513, filed in Republic of Korea on Jun. 18, 2015, all of which are hereby expressly incorporated by reference into the present application.

FIELD

Embodiments of the present disclosure relate to a portable acoustic device, more particularly, to an ear-wearable subminiature portable sound equipment which may receive an audio signal from a terminal by wireless communication and provide sound to a user.

BACKGROUND

A portable sound equipment means a sound device having an earphone and a microphone combined with each other and configured to receive an audio signal from a terminal and transmit the sound information collected via the microphone to the terminal. The portable sound equipment is often called the earset. A conventional portable sound equipment is usually a wire type configured to receive an audio signal after linked with an ear jack of a terminal unit via a terminal. In recent, there are increasing demands for wireless communication type wireless sound equipment because of mobility and usability.

The portable sound equipment may be classified into a stereo type with earbuds wearable on the right and left ears and a mono type having one earbud wearable on only one ear. In another aspect, the portable sound equipment may be classified into a kernel type configured to be inserted in an external auditory meatus and an open type wearable, not inserted in the external auditory meatus. A wireless portable sound equipment is carried in a state of being worn on the body part in when not used and the portability is put into operation.

The human right and left ears are different from each other in a shape so that the shape of the left earbud is different from that of the right earbud. Since the ears are usually different for each user, the shapes of the earbuds are not likely to be fitted to some users. In case of the kernel type configured to be inserted in the ear, the angle between an outer surface of the ear and the external auditory meatus plays an important role in determining the wearability.

SUMMARY

To overcome the disadvantages, embodiments of the present disclosure provide a mono-type portable sound equipment which is wearable one a user's right or left ear and deformable in a shape to be fitted to the user.

a portable sound equipment comprises a main body housing comprising a hole formed in a first surface; an audio output unit provided in the main body housing; an ear housing having a first end connected with the hole formed in the first surface of the main body housing and a second end having an audio hole formed therein; and a rotation module configured to relatively rotate the ear housing with respect to the main body housing.

The length of the main body housing in a first direction may be longer than the length of the main body housing in a second, and the rotation module may be rotatable on an axis of the first direction along the second direction.

The portable sound equipment may further comprise a cylindrical rotary housing projected from a first surface of the main body housing and having the ear housing inserted therein from one end, wherein the end of the rotary housing comprises grooves formed in both sides of the second direction, respectively.

The rotary module may comprise a hinge shaft coupled to the ear housing; and an arc-shaped friction member configured to face one end of the ear housing in contact, when the ear housing is rotated on the hinge shaft.

The rotation module may be configured to rotate the ear housing in plural directions.

The rotation module may comprise a ball hinge formed toward the hole of the ear housing; and a friction member having a curved surface surrounding the ball hinge, and the ball hinge may be rotated by the friction force of the friction member with respect to the surface of the ball hinge, only when a preset force or more is applied to the ear housing.

The portable sound equipment may further comprise a spring disposed between the ball hinge and the main body housing.

The rotation module may be projected near the hole in the main body housing, in a cylindrical shape, and the ear housing may be inserted in the rotation module and rotatable on the center of the cylindrical shape, and a second audio hole may be one-sided with respect to the center of the cylindrical shape.

The ear housing may comprise an atypical curve surface projected toward the second audio hole.

The ear housing may be separable from the rotation module and replaceable.

The ear housing may be coupled in a state of being inclined in a longitudinal direction of the first surface and rotatable in a traverse direction of the first surface.

A touch sensor may be formed in the second surface and configured to sense a touch input and the audio output module is controlled according to the touch input sensed by the touch sensor.

The portable sound equipment may further comprise a pair of microphones formed in different positions in the main body housing;

The portable sound equipment may further comprise a controller implemented to perform noise canceling for canceling the other sounds except a user's voice from the sounds acquired by the pair of the microphones.

The microphones may be provided in the first surface and a second surface which is the other opposite surface to the first surface of the housing.

The main body housing may be configured to be inserted in a user's tragus, antitragus and anthelix.

The portable sound equipment may further comprise an elastic ear rubber coupled to a second end of the ear housing.

Embodiments also provide a portable sound system comprising a portable sound equipment and a cradle for resting the portable sound equipment, the portable sound equipment comprising an earset housing; a main battery loaded in the earset housing; an audio output unit loaded in the earset housing; and a first terminal, and the cradle comprising a cradle housing; an earset insertion unit arranged in the cradle housing and having the portable sound equipment inserted therein; a sub-battery loaded in the cradle housing; and a second terminal exposed to the earset insertion unit and configured to be linked with the first terminal.

The earset housing of the portable sound equipment may comprise a main body housing having the battery and the audio output unit; and an ear housing connected with the first surface of the main body housing, and an end of the earset insertion unit faces the first surface of the main body housing in contact.

A second surface of the main body housing defines an exterior design of the cradle.

The cradle may further comprise a speaker, and a controller implemented to inactivate the audio output module when the first terminal is linked with the second terminal by inserting the portable sound equipment in the earset insertion unit, and control the speaker to output sounds.

The size of the first surface provided in the main body housing may be corresponding to the size of the earset and smaller than the side of the second surface, and the main body housing may further comprise a step formed in a rim of the first surface to compensate a size difference with the second surface, and the main body housing and the cradle housing may form a continuous flat surface.

ADVANTAGEOUS EFFECTS

The effects of the wireless sound equipment according to the embodiments of the disclosure will be as follows.

According to at least one of the embodiments, the portable sound equipment can be inserted in the user's ear and easily carried. Regardless of the left or right ear, the portable sound equipment 100 is capable of being worn on any one of the ears and changing the angle, fitted to the user's ear. Accordingly, the wearability may be enhanced.

Furthermore, the portable sound system including the cradle 200 may be realized and the functions may be expanded. Also, the use time of the battery may be extended.

It is to be understood that both the foregoing general description and the following detailed description are exemplary and explanatory and are intended to provide further explanation of the disclosed subject matter as claimed.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
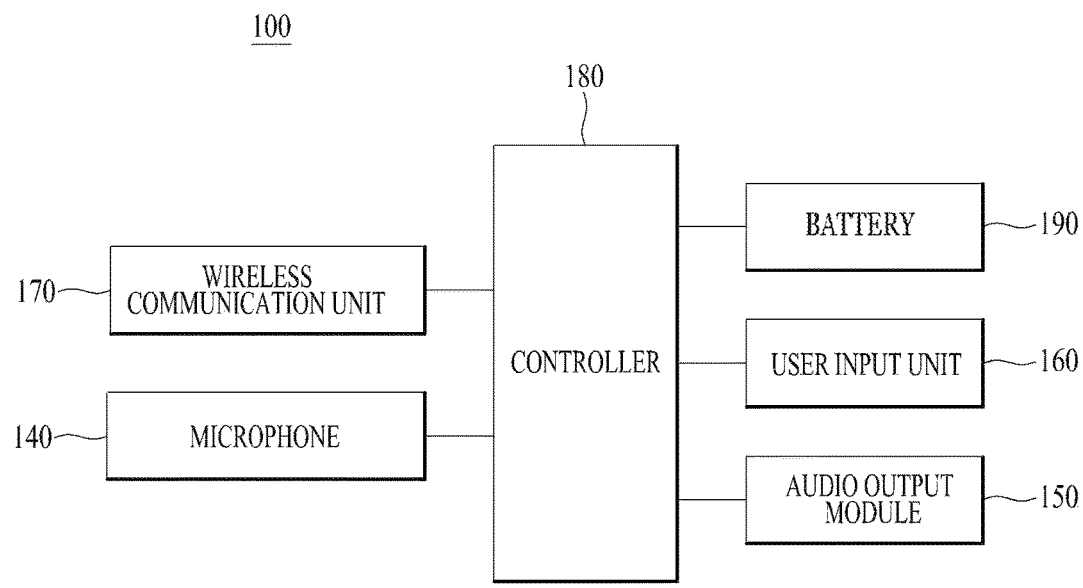
FIG. 1 is a block diagram illustrating a structure of a portable sound equipment associated with the present disclosure.
Figure 2:
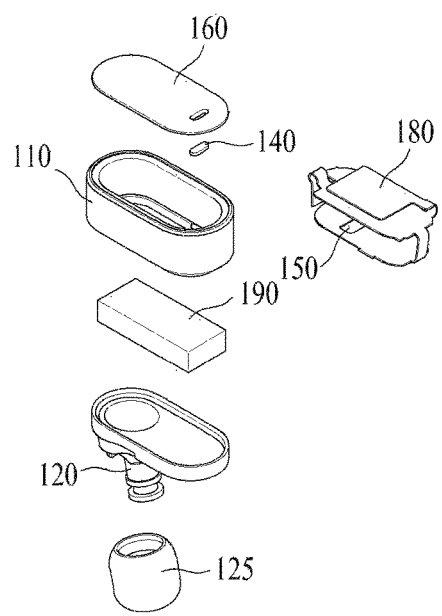
FIG. 2 is an exploded perspective diagram illustrating the portable sound equipment.

FIG. 1 is a block diagram of a wireless sound equipment 100 according to one embodiment of the disclosure. FIG. 2 is an exploded perspective diagram illustrating the portable sound equipment 100. Referring to FIGS. 1 and 2, the portable sound equipment 100 includes a wireless communication unit 170, a microphone 140, a controller 180, a battery 190, a user input unit 160 and an audio output unit 150.

The audio output unit 150 is configured to convert the audio data received from the wireless communication unit 170 or stored in a memory and the sound received from the microphone 140 in a call signal receive mode, a call or record mode, a voice recognize mode and a broadcasting receive mode to output the result of the conversion. The audio output unit 150 may be configured to output an audio signal which is associated with a call signal reception sound and a message reception sound.

The audio output unit 150 serves as the converter for converting an electrical signal into a sound and includes a diaphragm, voice coil and a magnet as main elements.

The diaphragm may be a thin vinyl film and changes air flow by using its vibration to generate sounds. To process all of frequencies from a low frequency band to a high frequency band by using one diaphragm, a special material is applied to the diaphragm by a steam compression method. The diaphragm is generally formed in a dome shape.

The magnet is made of Ferrite, AlNiCo (alloy of iron, nickel, aluminum and cobalt), samarium cobalt, neodymium or the like. In general, the magnet is formed in a donut shape and configured to form a magnetic field. The voice coil is arranged in the magnetic field created by the magnet.

The voice coil is attached to the diaphragm and currents flow along the voice coil according to the audio signal. When the currents flowing along the voice coil in the magnetic field created by the magnet are changed, a force is applied to the voice coil by the electromagnetic induction and the diaphragm is then moved. In other words, the currents flowing along the voice coil are changed according to the audio signal and then the diaphragm is moved to realize the audio signal into sounds so that the realized sounds may be provided to the user.

The wireless communication unit 170 is the device for performing wireless communication with a server and able to use different communication techniques according to a wireless communication object, a distance, the amount and speed of data. The wireless communication unit 170 may include one or more modules for connecting the portable sound equipment 100 with one or more networks according to each of the communication techniques. One of the main communication techniques used by the portable sound equipment 100 as the wireless communication module is short range communication.

Examples of the short range communication techniques include Bluetooth™, RFID (Radio Frequency Identification), IrDA (Infrared Data Association), UWB (Ultra Wideband), ZigBee, NFC (Near Field Communication), Wi-Fi (Wireless-Fidelity), Wi-Fi Direct and Wireless USB (Wireless Universal Serial Bus).

The controller 180 is configured to sense (or recognize) a communicable terminal near the portable sound equipment 100 to communicate. Moreover, the controller 180 may transmit a predetermined amount of the data processed in the portable sound equipment 100 to the sensed terminal via the wireless communication unit 170, in case the sensed terminal is a terminal authenticated to communicate with the portable sound equipment 100.

Accordingly, a user of the portable sound equipment 100 is able to use the data processed in a mobile terminal via the portable sound equipment 100. For example, when there is a call received in a mobile terminal, the user is able to answer a call or tall by using the portable sound equipment 100.

The microphone 140 processes an audio signal input from an external device into electric voice data. The processed voice data may be used based on the function performed in the portable sound equipment 100 or the application program implemented in the portable sound equipment. Various noise canceling algorithms for canceling the noise generated while the microphone is receiving an external audio signal can be realized in the microphone.

Two or more microphones 140 may be provided to realize the noise canceling. It may be determined whether the acquired sound is the user's voice or peripheral noise based on the sounds differently acquired according to the locations of the microphones 140.

The external sound recognized via the microphone 140 is amplified and provided via the audio output unit 150 so that the microphone 140 may function as the assist device for compensating the user's bad hearing.

The user input unit 160 is configured to receive information from the user. When information is input to the user input unit 160, the controller 180 is implemented to control the operation of the portable sound equipment 100 to be corresponding to the input information. Such the user input unit 160 may include mechanical input means (e.g., a dome switch, a jog wheel, a jog switch or the like) and touch input means.

The controller 180 is implemented to control the wireless communication unit 170 and the audio output unit 150 based on the control signal received from the microphone 140 and the user input unit 160. The controller 180 is configured to output sounds via the audio output unit 150 by amplifying the sound received via the microphone 140 or to provide music or a call sound to the user by controlling the audio output unit 150 according to the audio data received via the wireless communication unit 170. In addition, the controller is configured to control the operation of the portable sound equipment 100 based on the signal input to the user input unit 160 or transmit the control signal input to the user input unit 160 to an external terminal via the wireless communication unit 170.

The battery 190 is configured to supply the power to each electronic component under the control of the controller 180 and have the external power charged via a charger terminal. The charger terminal also functions as the interface configured to transceive data.

Figure 3:
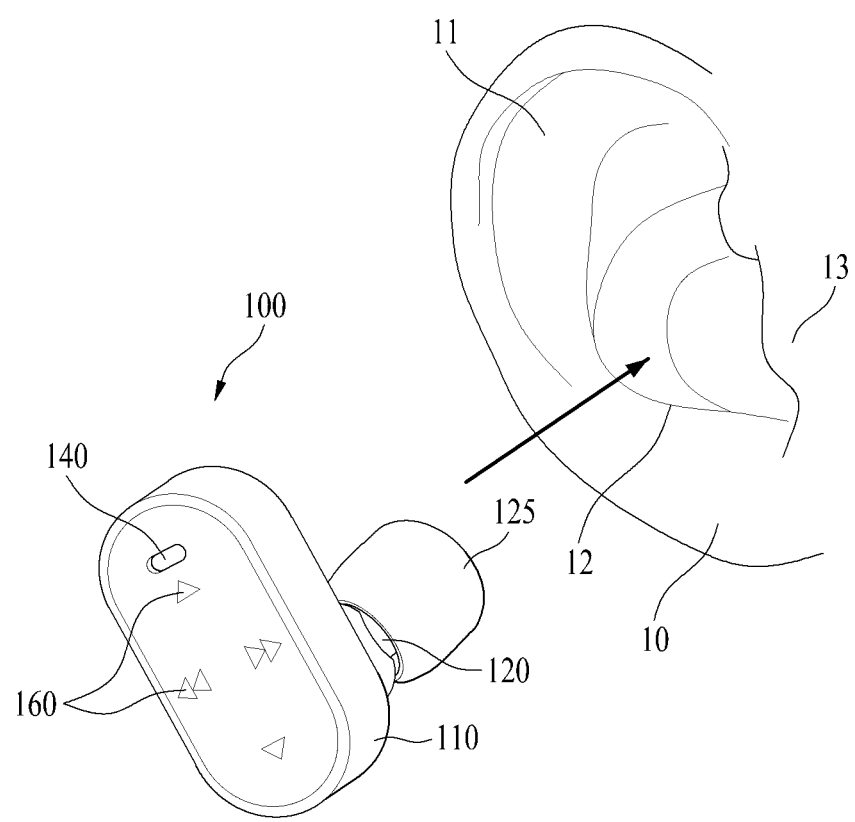
FIG. 3 is a perspective diagram illustrating the portable sound equipment.
Figure 4:
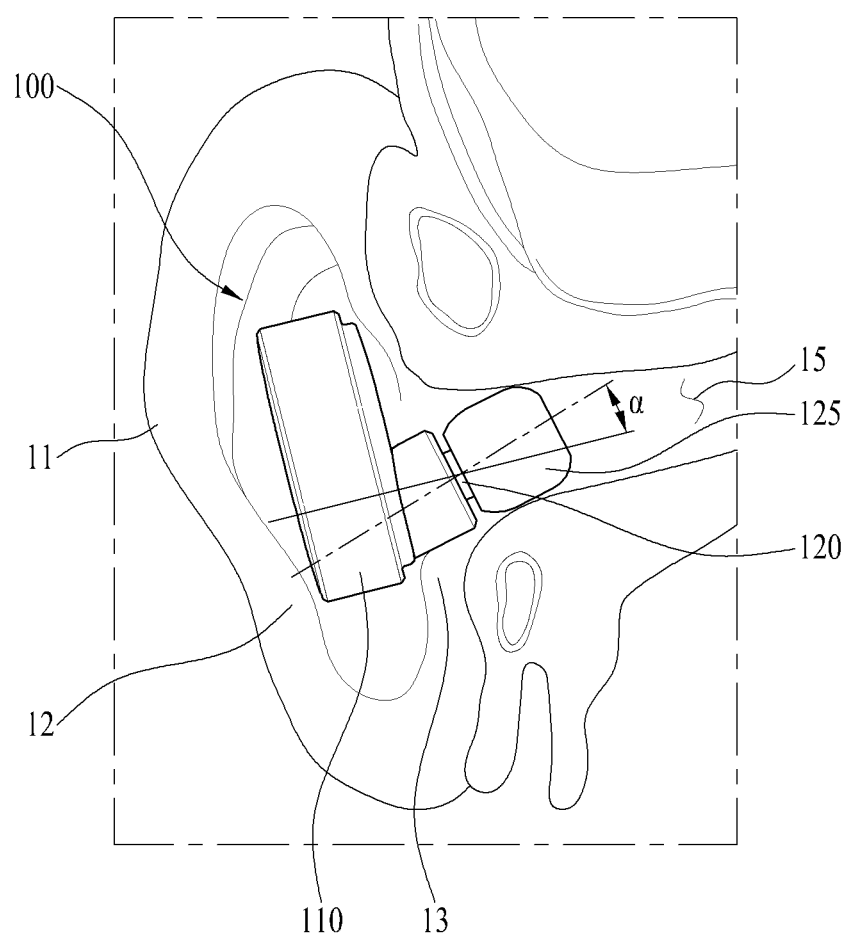
FIG. 4 is a diagram illustrating a state where the portable sound equipment is worn on the ear.

FIG. 3 is a perspective diagram illustrating the portable sound equipment 100 and FIG. 4 is a diagram illustrating a state where the portable sound equipment 100 is worn on the ear. The portable sound equipment 100 is a mono-type configured to be inserted in the user's ear 10 and a kernel type portable sound equipment 100 configured to be inserted in the user's external auditory meatus. The portable sound equipment 100 in accordance with the present disclosure is characterized to be realized in a compact size capable of being inserted in the user's ear 10 precisely.

The exterior design of the portable sound equipment 100 is configured of a main body housing 110 and an ear housing 120. The main body housing 110 is exposed outside when the user is wearing the portable sound equipment 100. The user's anthelix 11, antitragus 12 and tragus 13 function as hooking parts to secure the main body housing 110 to the user's ear.

More specifically, the main body housing 110 is sized to be located within the anthelix 11, antitragus 12 and tragus 13 of the user's ear. The length of the anthelix 11 is longer than the distance between the antitragus 12 and the tragus 13 so that the main body housing 110 may be formed longer along one direction as shown in FIG. 4.

As shown in FIG. 2, the main body housing 10 includes an electric control unit in which the wireless sound, a printed circuit board provided as the controller 180, the battery 190, the microphone 140 and the audio output unit 150 are loaded. The main body housing 110 may be formed of synthetic resin by injection molding or metal, e.g., stainless steel (STS), aluminum (Al), titanium (Ti) or the like.

The main body housing 110 includes a first surface provided to face the user's ear 10 when the user is wearing the portable sound equipment 100; and a second surface located in opposite to the first surface and exposed outside when the user is wearing the portable sound equipment 100. The first surface of the main body housing 110 has a hole to output the sound from the audio output unit 150. The second surface has a hole for the microphone 140 or the user input unit 160 realized therein by using a touch sensor.

The ear housing 120 has a first end connected with the hole of the first surface provided in the main body housing 110; and a second end having a sound hole 121 so that a sound passage may be formed from the first end connected with the hole to the second end located in opposite to the first end. The user's external auditory meatus is located in a space surrounded by the anthelix 11, antitragus 12 and tragus 13 of the user's ear 10, near the antitragus 12 and tragus 13, so that the ear housing 120 may be coupled to the main body housing 110 in a state of being one-sided along a longitudinal direction of the main body housing 110.

The ear housing 120 shown in FIG. 4 is insertedly secured to the user's external auditory meatus 15. As the size of the external auditory meatus 15 is different for each user, an ear cap 125 having a deformable elasticity according to the size of the external auditory meatus 15 may be provided in the second end of the ear housing 120. The ear cap 125 has a high frictional force enough to keep the inserted state in the external auditory meatus 15 advantageously. To fix the ear cap 125 to the ear housing 120, a groove (122, see FIG. 7) may be formed in the second end of the ear housing 120.

As shown in FIG. 4, the angle formed by the external surface of the user's ear 10 and the external auditory meatus 15 is bent a preset value ($\alpha$) upwardly, not a right angle. Accordingly, the ear housing 120 may be extended in one direction which is inclined the angle ($\alpha$) longitudinally with respect to the main body housing 110. The inclined direction is bending from a portion where the ear housing 120 is located in the longitudinal direction toward the opposite.

Figure 5:
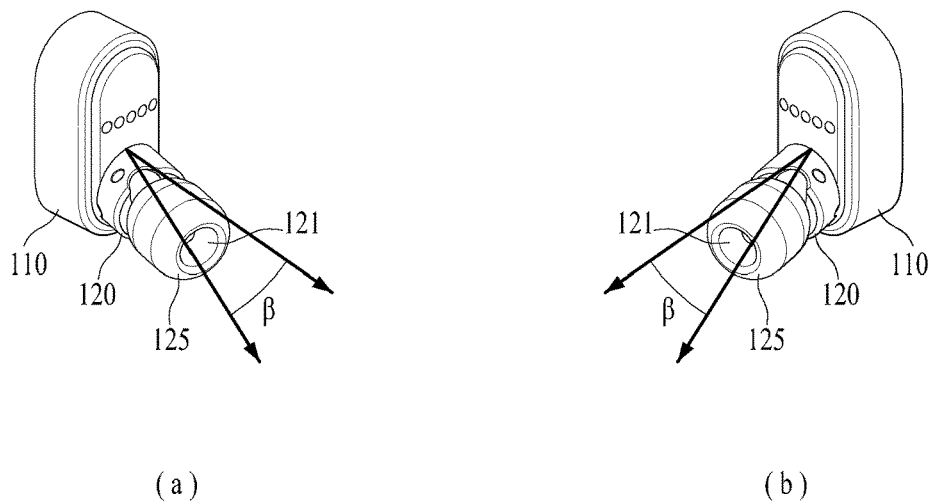
FIG. 5 is a diagram illustrating arrangements of a main body housing and an ear housing when the portable sound equipment is worn on the left ear and the right ear.

FIG. 5 is a diagram illustrating arrangements of the main body housing 110 and the ear housing 120 when the portable sound equipment 100 is worn on the left ear and the right ear. The structure of the human ears 10 is different in the right and left ears, in axial symmetry. The external auditory meatus 15 is obliquely extended from a side of the head in upward and forward directions. The upward inclination is equal in the right and left sides. When the ear housing 120 is inclinedly arranged at an angle of $\alpha$ in the longitudinal direction of the main body housing 110, the portable sound equipment 100 may be wearable on both of the right and left ears.

In this instance, the right and left direction of the right and left ears are bent in the opposite directions so that the portable sound equipment 100 has to be exclusively used for the left or right ear. Considering that the left ear is different from the right ear, the conventional earphone is distinguishably divided into a left earbud and a right earbud. The right and left earbuds are in symmetry.

FIG. 5 (a) illustrates the arrangement of the main body housing 110 and the ear housing 120 when the user is wearing the portable sound equipment 100 on the right ear. In the drawing, a lower portion is a direction toward the user's face. As the external auditory meatus is inclinedly extended at an angle of $\beta$ toward the face and the ear housing 120 is also inclinedly arranged at the angel of $\beta$ toward a left direction from a vertical direction of the main body housing 110.

FIG. 5 (b) illustrates the arrangement of the main body housing 110 and the ear housing 120 when the user is wearing the portable sound equipment 100 on the left ear. As the external auditory meatus is inclinedly extended at an angle of $\beta'$ toward the face and the ear housing 120 is also inclinedly arranged at the angel of $\beta'$ toward a right direction from the vertical direction of the main body housing 110. Band $\beta'$ may be equal to each other or somewhat different from each other.

More specifically, the angle formed between the main body housing 110 and the ear housing 120 is as inclined as $\beta$ from the vertical direction to the left direction of the main body housing 110, when the user is wearing the portable sound equipment 100 on the right ear. The angle formed between the main body housing 110 and the ear housing 120 is as inclined as $\beta'$ from the vertical direction to the right direction of the main body housing 110, when the user is wearing the portable sound equipment 100 on the right ear.

The arrangement of the ear housing 120 with respect to the main body housing 110 is different when the user is wearing the portable sound equipment 100 on the left ear from when he or she is wearing it on the right ear. Accordingly, the angle of the ear housing 120 can be variable in a traverse direction of the main body housing 110.

Figure 6:
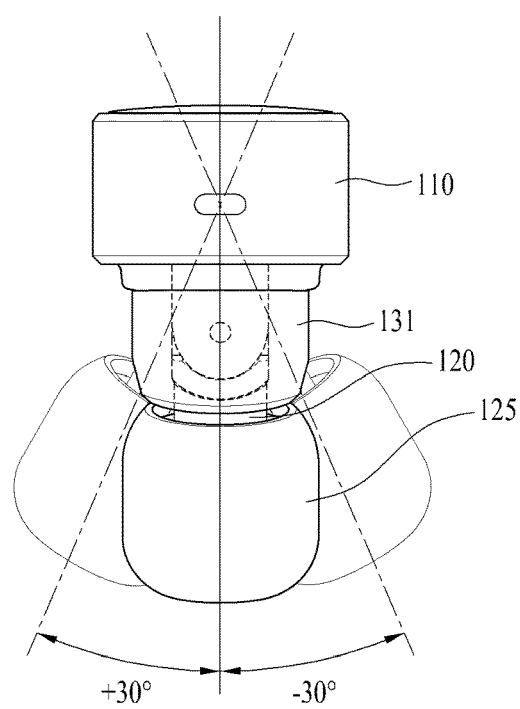
FIG. 6 is a diagram illustrating the deformation of a portable sound equipment in accordance with a first embodiment.

FIG. 6 is a diagram illustrating the deformation of a portable sound equipment 100 in accordance with a first embodiment. FIG. 6 is the diagram of the portable sound equipment 100 viewed from a top showing that the ear housing 120 is rotatable at a preset angle in a right and left direction. The angle of the human external auditory meatus 15 bent forwardly is typically 30 degrees or less. When the ear housing 120 is rotatable within 30 degrees in the right and left direction, the portable sound equipment 100 may be wearable on the right and left ears.

A rotation module may be provided between the ear housing 120 and the main body housing 110 to allow the ear housing 120 to become rotatable in the traverse direction of the main body housing 110. The rotation module may include all of the embodiments including the first embodiment of the portable sound equipment 100 which is rotary only in the right and left direction (only in one direction), second and third embodiments shown in FIGS. 8 and 10 which are rotatable three or more directions including the right and left direction.

Figure 7:
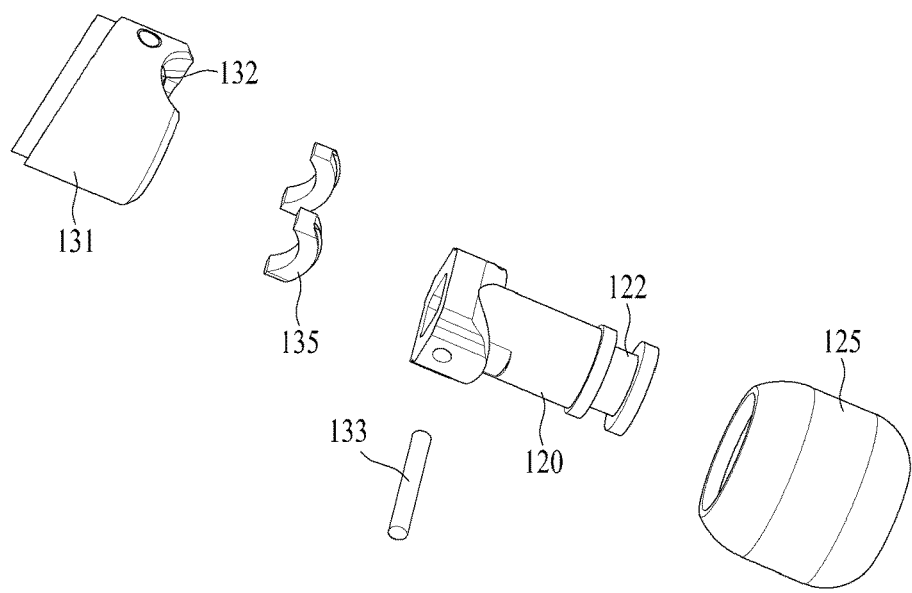
FIG. 7 is an exploded perspective diagram illustrating the first embodiment of the portable sound equipment.

FIG. 7 is an exploded perspective diagram illustrating the first embodiment of the portable sound equipment 100. The portable sound equipment 100 may further include a rotary housing 131 projected from the first surface of the main body housing 110. The rotary housing 131 is formed in a cylinder shape and inclinedly projected from the main body housing 110 along the longitudinal direction of the main body housing 110. One end of the rotary housing 131 is open and inserted in the ear housing 120. A rotation member is provided in the rotary housing 131 to rotate the ear housing 120 in the right and left direction.

To prevent the rotational movement of the ear housing 120 from being limited by the contact with the rotation housing 131 when the ear housing 120 rotated by the rotation member, the ear housing 120, grooves 132 may be formed in the right and left portions of the rotation housing 131 which might be the interference portions of the rotation. The groove 132 may be formed in an arc shape, corresponding to a curved outer surface of the cylindrical ear housing 120 in accordance with the illustrated embodiment.

The rotation module located in the rotary housing 131 may include a hinge shaft 133 penetrating the ear housing 120 from one side of the ear housing 120; and an arc-shaped friction member 135 which faces the end of the ear housing 120, in contact. As the ear hinge shaft 133 is rotatable in the traverse direction of the main body housing 110, the hinge shaft 133 is inserted along the longitudinal direction of the main body housing 110.

The friction member 135 is in closely contact with the first end of the ear housing 120 and configured to restrict the rotation. The ear housing 120 is rotated when the user applies a force stronger than a reference force to the ear housing 120. However, unless the user applies the force, the friction force between the friction member 135 and the first end of the ear housing 120 keeps the angle between the ear housing 120 and the main body housing 110. The first end of the ear housing 120 facing the friction member in contact 135 may be coated or surface-treated with a material having a high friction force.

Figure 8:
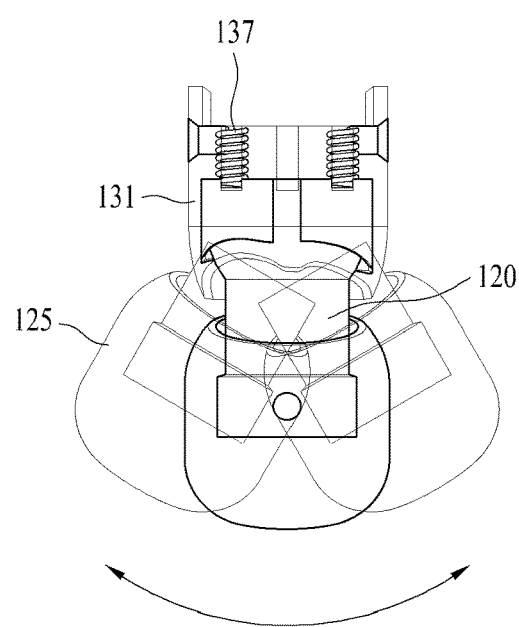
FIG. 8 is a diagram illustrating the deformation of a portable sound equipment in accordance with a second embodiment.
Figure 9:
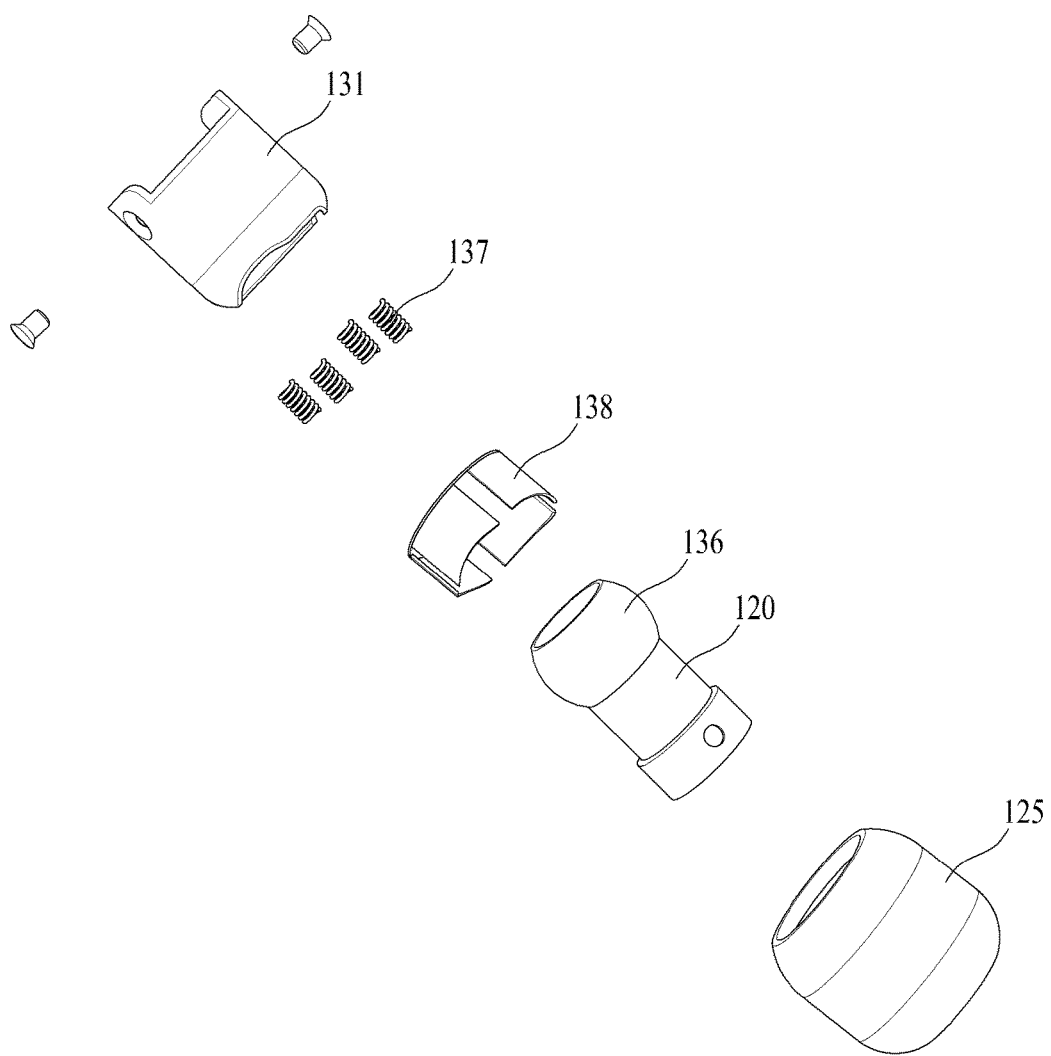
FIG. 9 is an exploded perspective diagram illustrating the second embodiment of the portable sound equipment.

FIG. 8 is a diagram illustrating the deformation of a portable sound equipment 100 in accordance with a second embodiment. FIG. 9 is an exploded perspective diagram illustrating the second embodiment of the portable sound equipment 100;

The rotation member of the second embodiment is configured to move the ear housing 120 in all directions as well as in the traverse direction of the main body housing 110, so that the angle between the main body housing 110 and the ear housing 120 may be variable in plural directions. In the illustrated embodiment, the rotation module may further include a ball hinge 136 having a curved surface provided in the first end of the ear housing 120; and a friction member 138 configured to supply a friction force to a surface of the ball hinge 136, surrounding the ball hinge 136.

The friction member 138 shown in FIG. 9 is formed in a cylindrical shape surrounding the ball hinge 136 and an inner surface of the friction member has a curved surface corresponding to the surface of the ball hinge 136. The friction member 138 has a ball-like surface so as to be movable in diverse directions in the friction member 138, so that the ear housing 120 may be bending in diverse directions.

In this instance, an elastic member 137 may be further provided between the main body housing 110 and the ball hinge 136 to facilitate the more natural movement of the rotation module. The elastic member 137 may be formed as a plurality of springs.

Figure 10:
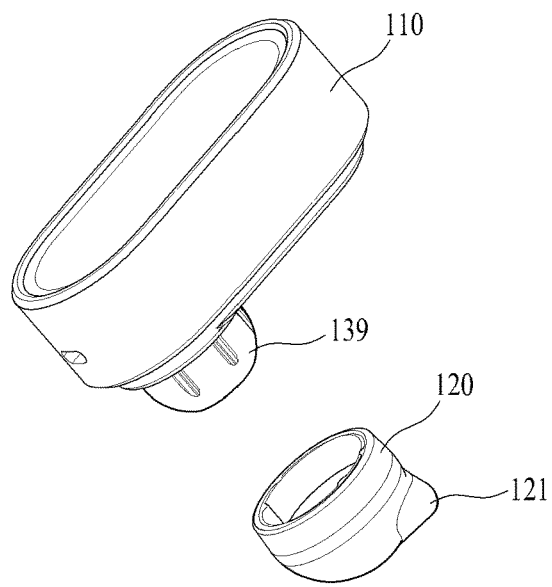
FIG. 10 is an exploded perspective diagram illustrating a third embodiment of a portable sound equipment.
Figure 11:
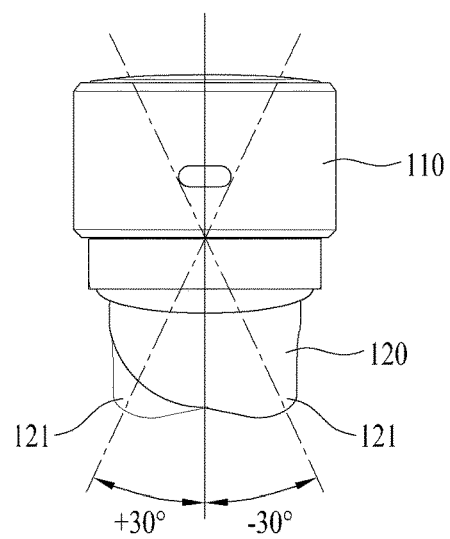
FIG. 11 is a diagram illustrating the deformation of the portable sound equipment in accordance with the third embodiment.

FIG. 10 is an exploded perspective diagram illustrating a third embodiment of a portable sound equipment 100 and FIG. 11 is a diagram illustrating the deformation of the portable sound equipment 100 in accordance with the third embodiment.

The rotation module 139 in accordance with the illustrated embodiment shown in FIG. 10 is formed in a cylindrical shape and projected from the first surface of the main body housing 110. While the ear housing 120 is insertedly fitted to the cylindrical rotation module 139, the ear housing 120 is rotated along an outer circumferential surface of the rotation module 139.

The ear housing 120 of the illustrated embodiment has an audio hole 121 formed in the second end which is one-sided and rotatable along the outer surface of the rotation module 139. When the ear housing 120 is rotated, the position of the audio hole 121 one-sided in the ear housing 120 is changed as shown in FIG. 11. The angle of the one-sided audio hole 121 from the first surface of the main body housing 110 may be about 30 degrees.

The ear housing 120 may include an atypical curve which acuminates more as approaching the audio hole 121 and the atypical curve may facilitate the insertion of the ear housing 110 in the user's external auditory meatus 15. In the illustrated embodiment, an elastic member such as polyurethane or silicon is attached to the surface of the ear housing 120 to be deformed when the ear housing 120 is worn on the ear 10 so that the wearability may be enhanced. The elastic member such as polyurethane or silicon has a high friction force so that it can prevent the ear housing 120 from falling out from the ear 10.

Moreover, the ear housing 120 in accordance with the illustrated embodiment shown in FIG. 10 may be inserted in the cylindrical rotation module 139 without any securing structure to be coupled to the main body housing 110. Accordingly, the rear housing 120 is replaced by a new ear housing having a shape which can make the user feel more comfortable when wearing the ear housing.

Figure 12:
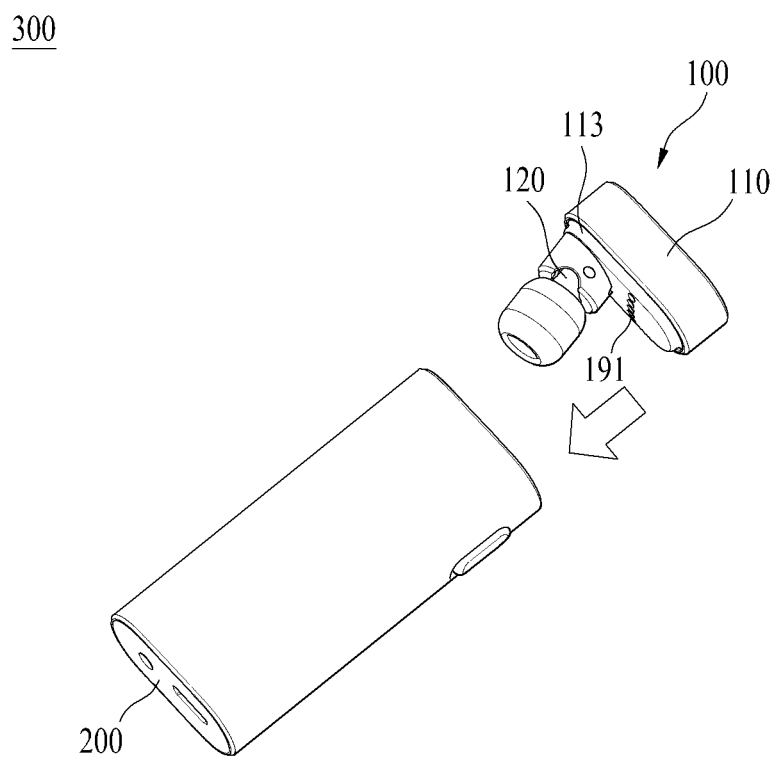
FIG. 12 is a perspective diagram illustrating a cradle and the portable sound equipment in accordance with the present disclosure.
Figure 13:
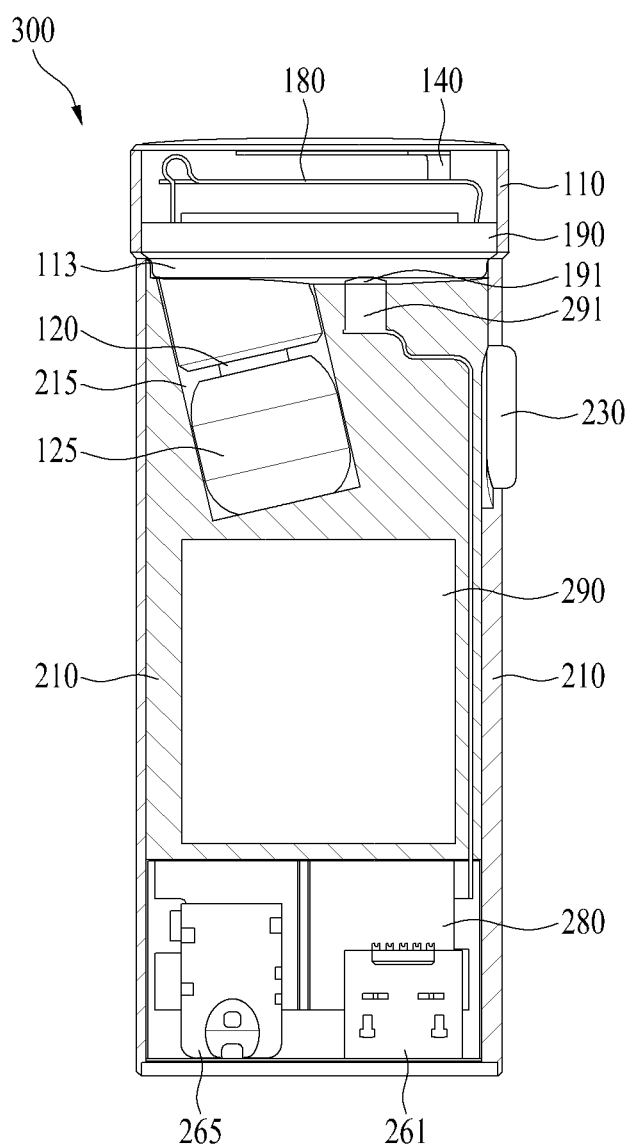
FIG. 13 is a sectional diagram illustrating a state where the portable sound equipment is insertedly rested in the cradle.
Figure 14:
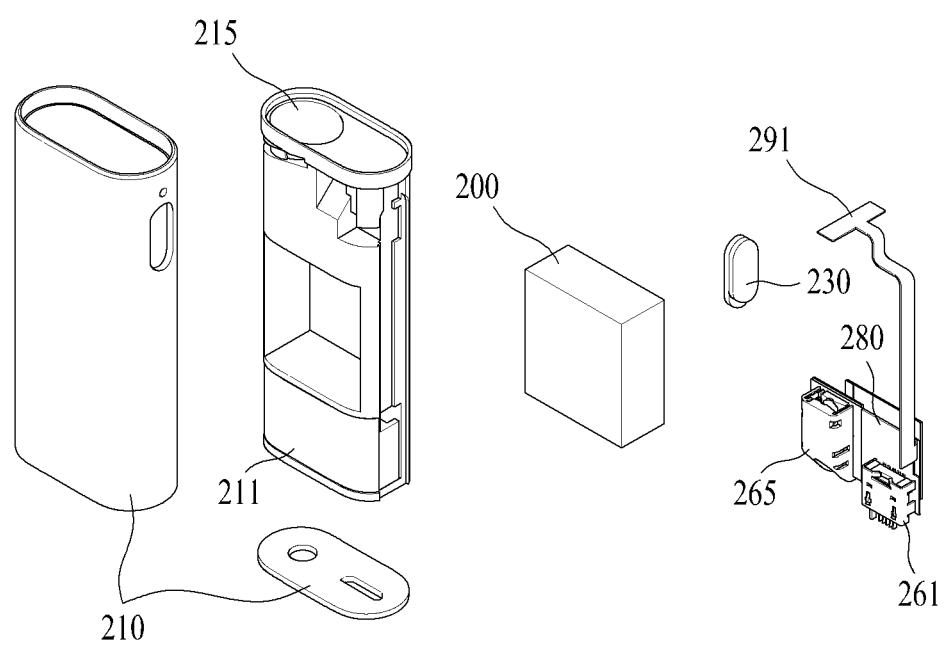
FIG. 14 is an exploded perspective diagram illustrating the cradle and the portable sound equipment.

FIG. 12 is a perspective diagram illustrating a cradle 200 and the portable sound equipment 100 in accordance with the present disclosure. FIG. 13 is a sectional diagram illustrating a state where the portable sound equipment 100 is insertedly rested in the cradle 200. FIG. 14 is an exploded perspective diagram illustrating the cradle 200 and the portable sound equipment 100.

The portable sound equipment 100 in accordance with the present disclosure is compact-sized and it is impossible to provide a large capacity battery 190 in the portable sound equipment 100. Also, it is difficult to provide a charger cable terminal and a speaker in the portable sound equipment 100 and it is then concerned that the compact-sized portable sound equipment 100 may be lost or damaged. To solve such disadvantages, a cradle 200 may be further provided so that the user can carry a sub-battery 290 only to realize the portable sound system.

The cradle 200 includes a cradle housing 210; an earset insertion unit arranged in the cradle housing 210 and having the portable sound equipment 100 insertedly rested therein; a sub-battery 290 located in the cradle housing 210; and a second terminal exposed to the earset insertion unit and configured to be linked with the first terminal.

The cradle housing 210 defines an exterior of the cradle 200 and has an empty space formed in the center. A component frame may be further provided and the internal components loaded in the cradle housing 210 are located and the earset insertion unit is provided in the component frame. The component frame and the cradle housing 210 may be integrally formed with each other.

The earset insertion unit may be formed in a pouch shape in which the entire portable sound equipment 100 is inserted not to be exposed outside. As one alternative example shown in FIG. 13, the ear housing 120 of the portable sound equipment 100 is accommodated and the main body housing 110 is coupled to the cradle 200, except the first surface having the ear housing 120 formed therein.

To couple the portable sound equipment 100 to the cradle 200, a hook structure or a magnet may be used. In the illustrated embodiment, a structure for allowing the portable sound equipment 100 not to fall out from the cradle 200 easily after coupled to the cradle 200.

As shown in FIG. 12, a step is formed in the rim of the first surface provided in the portable sound equipment 100 so that the first surface may be formed smaller than the rim of the main body housing 110. In other words, the first surface is smaller than the second surface and the step is corresponding to the thickness of the cradle housing 210.

Accordingly, the first surface and the ear housing 120 are inserted in the cradle 200 and the main body housing 110 and the other surface are exposed outside as shown in FIG. 13, with respect to the area with the step as a boundary, so that the boundary between the main body housing 110 and the cradle housing 210 may form a continuous surface and provide the exterior design with uniformity.

The sub-battery 290 is a higher capacity battery than the battery 190 provided in the portable sound equipment 100. The portable sound equipment 100 may include the first terminal and the cradle 200 may include a second terminal 291 to connect the portable battery and the sub-battery 290 with each other. When the first terminal is connected with the second terminal 291, the controller 180 as well as the battery 190 of the portable sound equipment 100 may be connected with a controller 280 as well as the sub-battery 290 of the cradle 200.

The cradle 200 may further include a charger socket 261 for charging the sub-battery 290 of the cradle 200; and an ear jack 265 to allow the user to listen to music in a state where the portable sound equipment 100 is insertedly rested in the cradle 200. Alternatively, a speaker (not shown) may be provided in the cradle 200 to output music there from in a state where the portable sound equipment 100 is insertedly rested in the cradle 200.

The cradle 200 may include its user input unit 230. However, in a state where the portable sound equipment 100 is insertedly rested in the cradle 200, the cradle 200 may be controlled by using the user input unit 160 of the portable sound equipment 100.

As mentioned above, according to at least one of the embodiments, the portable sound equipment can be inserted in the user's ear and easily carried. Regardless of the left or right ear, the portable sound equipment 100 is capable of being worn on any one of the ears and changing the angle, fitted to the user's ear. Accordingly, the wearability may be enhanced.

Furthermore, the portable sound system including the cradle 200 may be realized and the functions may be expanded. Also, the use time of the battery may be extended.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A portable sound equipment comprising:
    a main body housing comprising a hole formed in a first surface;
    a cylindrical rotary housing projected from the first surface of the main body housing;
    an audio output unit provided in the main body housing;
    an ear housing inserted in the cylindrical rotary housing and having a first end connected with the hole formed in the first surface of the main body housing and a second end having an audio hole formed therein; and
    a rotation module configured to relatively rotate the ear housing with respect to the main body housing in a second direction,
    wherein the rotation module comprises:
    a hinge shaft elongated in a first direction and coupled to the ear housing and the cylindrical rotary housing; and
    an arc-shaped friction member configured to face one end of the ear housing in contact, when the ear housing is rotated on the hinge shaft, and
    wherein the end of the rotary housing comprises grooves formed in both sides of the second direction, respectively.

2. The portable sound equipment of claim 1, wherein the length of the main body housing in the first direction is longer than the length of the main body housing in the second direction, the second direction being perpendicular to the first direction, and
    the rotation module is rotatable on an axis of the first direction along the second direction.

3. The portable sound equipment of claim 1, wherein the rotation module is configured to rotate the ear housing in plural directions.

4. The portable sound equipment of claim 1, wherein the rotation module comprises:
    a ball hinge formed toward the hole of the ear housing; and
    a friction member having a curved surface surrounding the ball hinge, and
    the ball hinge is rotated by the friction force of the friction member with respect to the surface of the ball hinge, only when a preset force or more is applied to the ear housing.

5. The portable sound equipment of claim 4, further comprising:
    a spring disposed between the ball hinge and the main body housing.

6. The portable sound equipment of claim 1, wherein the ear housing is coupled in a state of being inclined in a longitudinal direction of the first surface and rotatable in a traverse direction of the first surface.

7. The portable sound equipment of claim 1, wherein a touch sensor is formed in the second surface and configured to sense a touch input and the audio output module is controlled according to the touch input sensed by the touch sensor.

8. The portable sound equipment of claim 1, further comprising:
    a pair of microphones formed in different positions in the main body housing; and
    a controller implemented to perform noise canceling for canceling the other sounds except a user's voice from the sounds acquired by the pair of the microphones.

9. The portable sound equipment of claim 8, wherein the microphones are provided in the first surface and a second surface which is the other opposite surface to the first surface of the housing.

10. The portable sound equipment of claim 1, wherein the main body housing is configured to be inserted in a user's tragus, antitragus and anthelix.

11. The portable sound equipment of claim 1, further comprising:
    an elastic ear rubber coupled to a second end of the ear housing.

12. A portable sound equipment comprising:
    a main body housing comprising a hole formed in a first surface;
    an audio output unit provided in the main body housing;
    an ear housing having a first end connected with the hole formed in the first surface of the main body housing and a second end having an audio hole formed therein; and
    a rotation module configured to relatively rotate the ear housing with respect to the main body housing, wherein the rotation module is projected near the hole in the main body housing, in a cylindrical shape, and the ear housing is inserted in the rotation module and rotatable on a center of the cylindrical shape and separable from the rotation module and replaceable, and a second audio hole is one-sided with respect to the center of the cylindrical shape.

13. The portable sound equipment of claim 12, wherein the ear housing comprises an atypical curve surface projected toward the second audio hole.

14. A portable sound equipment comprising:

a main body housing comprising a hole formed in a first surface;

an audio output unit provided in the main body housing;

an ear housing having a first end connected with the hole formed in the first surface of the main body housing and a second end having an audio hole formed therein; and a rotation module configured to relatively rotate the ear housing with respect to the main body housing, wherein the rotation module comprises:

a ball hinge formed toward the hole of the ear housing;

a spring disposed between the ball hinge and the main body housing; and a friction member having a curved surface surrounding the ball hinge, and wherein the ball hinge is rotated by the friction force of the friction member with respect to the surface of the ball hinge, only when a preset force or more is applied to the ear housing.

* * * * *